(12) United States Patent
Orlovic et al.

(10) Patent No.: US 11,998,034 B2
(45) Date of Patent: Jun. 4, 2024

(54) PARTICULATE COMPOSITION CONTAINING CO-CRYSTAL OF MALIC ACID AND ALKALI METAL HYDROGEN MALATE

(71) Applicant: Purac Biochem B.V., Gorinchem (NL)

(72) Inventors: Marija Orlovic, Gorinchem (NL); Jan Van Krieken, Gorinchem (NL)

(73) Assignee: Parac Biochem B.V., Gorinchem (NL)

( * ) Notice: Subject to any disclaimer, the term of this patent is extended or adjusted under 35 U.S.C. 154(b) by 105 days.

(21) Appl. No.: 17/561,271

(22) Filed: Dec. 23, 2021

(65) Prior Publication Data

US 2022/0110352 A1    Apr. 14, 2022

Related U.S. Application Data

(63) Continuation of application No. PCT/EP2020/067337, filed on Jun. 22, 2020.

(30) Foreign Application Priority Data

Jun. 26, 2019 (EP) .................... 19182574

(51) Int. Cl.
*A23L 29/00* (2016.01)
*A23P 20/18* (2016.01)

(52) U.S. Cl.
CPC ............. *A23L 29/035* (2016.08); *A23P 20/18* (2016.08)

(58) Field of Classification Search
CPC .......... A23G 3/54; A23G 3/346; A23G 3/343; A23L 27/72; A23L 29/035; A23P 20/18
USPC ....................................... 426/74
See application file for complete search history.

(56) References Cited

U.S. PATENT DOCUMENTS

2007/0231455 A1   10/2007   Bontenbal
2008/0014312 A1    1/2008   Notebaart et al.

FOREIGN PATENT DOCUMENTS

WO    WO-2008/006878 A1    1/2008
WO    WO-2019/063623       4/2019

OTHER PUBLICATIONS

"Purac? Powder MA", Corbion, Mar. 7, 2017.
Fleck et al., "Dielectric and Pyroelectric Properties of Lithium Hydrogen Dimalate, LiH3 (C4 H4 o5) 2", Z. Naturforsch, vol. 41a, 1986, pp. 1289-1296.
Van Havere et al., "Crystal structure of bis(potassium hydrogen L-malate) 9 malic acid, 2 [K (C4H5O5)-] 9 C4H6O5", Journal of Crystallographic and Spectroscopic Research, vol. 15, No. 1, 1985, pp. 45-52.
International Search Report and Written Opinion for PCT/EP2020/067337 dated Sep. 22, 2020.

*Primary Examiner* — Subbalakshmi Prakash
(74) *Attorney, Agent, or Firm* — Sunit Talapatra; Foley & Lardmer LLP

(57) ABSTRACT

The invention provides a particulate composition comprising at least 1 wt. % of malate particles, said malate particles having a diameter of 50 to 1000 μm and comprising at least 70 wt. % of co-crystal of malic acid and alkali metal hydrogen malate.
Co-crystals of malic acid and alkali metal hydrogen malate can be produced in the form of powders that exhibit very low hygroscopicity and that are capable of imparting a sour flavour that is very similar to that of malic acid.
The invention also relates to the use of the aforementioned malate particles as a food ingredient.

16 Claims, 1 Drawing Sheet

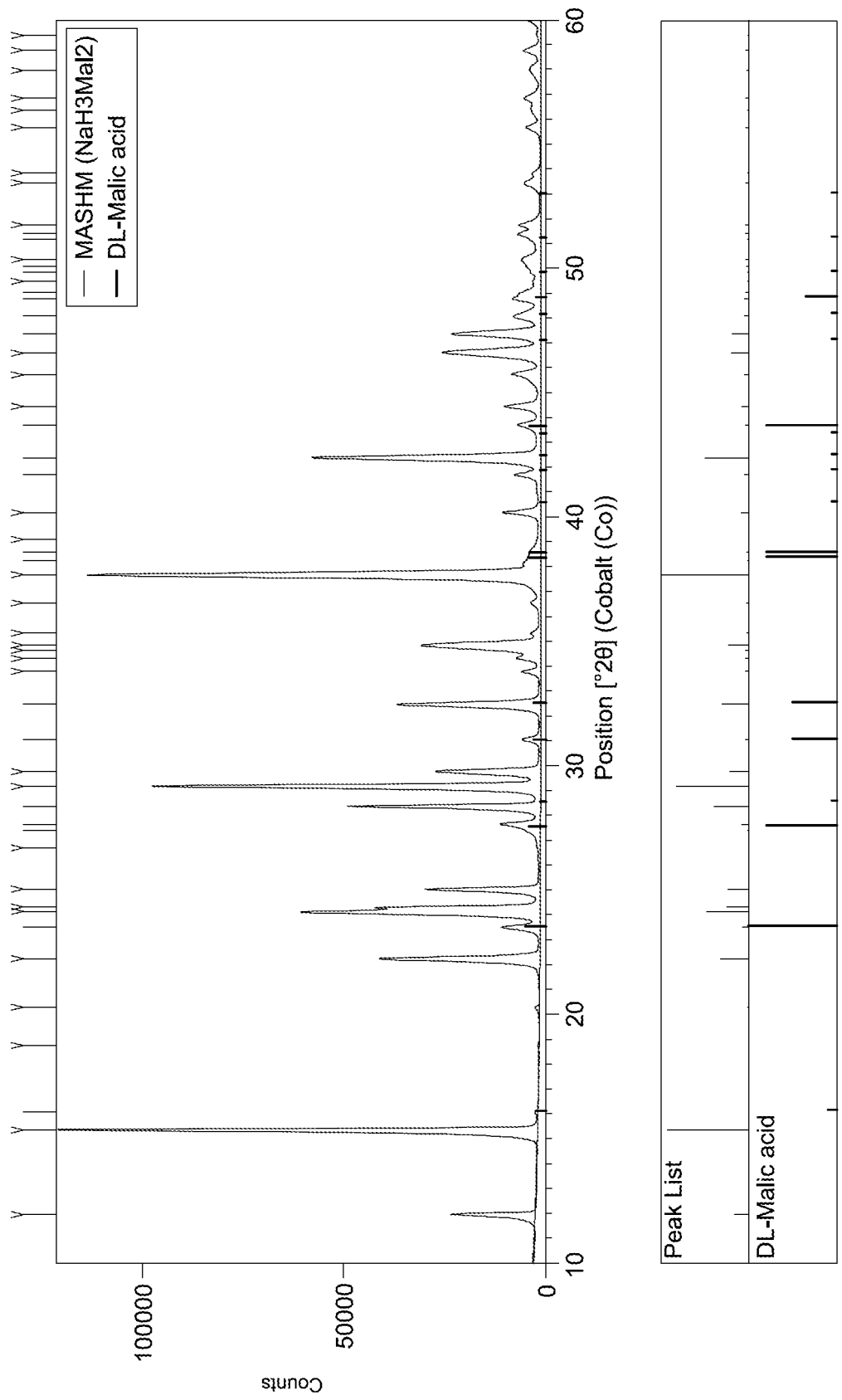

PARTICULATE COMPOSITION CONTAINING CO-CRYSTAL OF MALIC ACID AND ALKALI METAL HYDROGEN MALATE

CROSS-REFERENCE TO RELATED APPLICATIONS

The present application is a Continuation of International Patent Application No. PCT/EP2020/067337, filed Jun. 22, 2020, which claims priority to European Patent Application No. 19182574.4 filed Jun. 26, 2019; the entire contents of all of which are hereby incorporated by reference.

TECHNICAL FIELD OF THE INVENTION

The present invention relates to a particulate composition containing a co-crystal of malic acid and alkali metal hydrogen malate. More particularly, the invention relates to a particulate composition comprising malate particles comprising at least 70 wt. % of co-crystal of malic acid and alkali metal hydrogen malate. Examples of such co-crystals include sodium hydrogen malate·malic acid $(Na^+(C_4H_5O_5)^- \cdot C_4H_6O_5)$ and bis(potassium hydrogen L-malate)•malic acid and dipotassium tetrahydrogen trimalate $(2[K^+(C_4H_5O_5)^-] \cdot C_4H_6O_5)$.

The invention further relates to a method of preparing the aforementioned malate particles and to the use of these malate particles as a food ingredient.

BACKGROUND OF THE INVENTION

Van Havere et al. (*Crystal structure of bis(potassium hydrogen L-malate)·malic acid,* $2[K^+(C_4H_5O_5)^-] \cdot C_4H_6O_5$, Journal of Crystallographic and Spectroscopic Research (1985), 15(1), 45-52) describe the crystal structure of bis (potassium hydrogen L-malate)•malic acid.

Fleck et al. (*Dielectric and Pyroelectric Properties of Lithium Hydrogen Dimalate,* $LiH_3(C_4H_4O_5)_2$. Z. Naturforsch. 41a, 1289-1296 (1986); received Jul. 5, 1986) describe how $LiH_3(C_4H_4O_5)_2$ was prepared from an aqueous solution containing stoichiometric amounts of LiOH and malic acid (1:2). Large single crystals (15×8×6 mm) could be grown by slow evaporation of $H_2O$ from the aqueous solution at 290 K.

Malic acid (2-Hydroxybutanedioic acid) is the main acid in many fruits, including apricots, blackberries, blueberries, cherries, grapes, mirabelles, peaches, pears, plums, and quince and is present in lower concentrations in other fruits, such as citrus. It also contributes to the sourness of green (unripe) apples. The taste of malic acid is very clear and pure in rhubarb, a plant for which it is the primary flavour substance. Malic acid is used as a food additive in noncarbonated drinks, wines, confectioneries, chewing gum, desserts and baked goods.

It is well-known to coat sugar confectionery with a blend of sugar and acid powders (called 'acid sanding'). Use of powdered malic acid in acid sanding is associated with stability problems that arise from the fact that malic acid is hygroscopic. Malic acid powder attracts significant moisture from its surroundings and exhibits deliquescence. This process has an adverse impact on the appearance of the product, but also on its taste and texture, and can therewith lead to a reduced shelf life.

In order to improve the stability of malic acid, it is known to coat malic acid with coating material such as fat or sodium hydrogen malate. Purac® Powder MA is a commercially available malic acid powder coated with sodium hydrogen malate. The powder contains 42-50% (w/w) sodium hydrogen malate and 50-58% (w/w) malic acid.

US 2008/014312 describes a food-grade particle comprising a core-coating configuration wherein the coating comprises at least one layer, each of which layers being made of a composition comprising at least 50 wt % of a partially neutralized polycarboxylic acid, wherein said partially neutralized polycarboxylic acid comprises at least one carboxylic group in the acid form and at least one carboxylic group in the salt form and wherein the core comprises at least one food-grade acid or a salt thereof. Example 1 describes the preparation of a mixture of malic acid particles coated with monosodium hydrogen malate, mono-sodium hydrogen malate particles coated with mono-sodium hydrogen malate, and agglomerates of malic acid and mono-sodium hydrogen malate coated with mono-sodium hydrogen malate.

Although coating of malic acid particles with sodium hydrogen malate significantly improves moisture stability, even these coated malic acid particles suffer from moisture absorption and are thus intrinsically unstable. Furthermore, powders that contain such coated particles tend to be inhomogeneous in that the composition of the coated particles varies with particle size. This can become an issue if powder segregation occurs, e.g. during transportation. Also, the particle size cannot easily be controlled as a consequence of this inhomogeneity.

WO 2019/063623 describes a particulate acidulant composition comprising 20-70 wt. % malic acid, 3-40 wt. % lactic acid and 0-40 wt. % of food acid selected from citric acid, fumaric acid, adipic acid, tartaric acid and acetic acid and combinations thereof, wherein the acidulant composition comprises:
- 40-90 wt. % of M-particles comprising co-crystal of malic acid and partially neutralized polycarboxylic acid selected from malic acid, citric acid, fumaric acid, adipic acid, tartaric acid, and combinations thereof, said M-particles containing at least 30 wt. % malic acid and at least 30 wt. % of the partially neutralized polycarboxylic acid;
- 5-60 wt. % of L-particles comprising co-crystal of lactic acid and at least partially neutralized carboxylic acid selected from lactic acid, malic acid, citric acid, fumaric acid, adipic acid, tartaric acid, and combinations thereof, said L-particles containing at least 30 wt. % lactic acid and at least 30 wt. % of the at least partially neutralized carboxylic acid; and wherein the combination of M-particles and L-particles constitutes at least 50 wt. % of the acidulant composition.

The Examples of the aforementioned international patent application describe powder blends comprising 80 wt. % of Purac Powder MA (42-50 wt. % sodium hydrogen malate and 50-58 wt. % malic acid), produced in a fluid bed dryer by spraying an aqueous solution of lactic acid onto a bed of calcium lactate particles. Purac Powder MA typically contains 40-50 wt. % of co-crystal of malic acid and sodium hydrogen malate.

SUMMARY OF THE INVENTION

The inventors have unexpectedly discovered that co-crystals of malic acid and alkali metal hydrogen malate can be produced in the form of powders that exhibit very low hygroscopicity and that are capable of imparting a sour flavour that is very similar to that of malic acid. Thus, the present invention provides a particulate composition comprising at least 1 wt. % of malate particles, said malate particles having a diameter of 50 to 1000 μm and comprising at least 70 wt. % of co-crystal of malic acid and alkali metal hydrogen malate.

The malate particles of the present invention remain free flowing even at high temperatures and high humidity. Furthermore, the composition of the malate particles does not vary with particle size.

Examples of co-crystals of malic acid and alkali metal hydrogen malate that are encompassed by the present invention include sodium trihydrogen dimalate and dipotassium tetrahydrogen trimalate. The sodium trihydrogen dimalate co-crystal can be represented by formula $Na^+(C_4H_5O_5)^-\cdot C_4H_6O_5$, whereas the potassium tetrahydrogen trimalate co-crystal can be represented by the formula $2[K^+(C_4H_5O_5)^-]\cdot C_4H_6O_5$.

Although the inventors do not wish to be bound by theory, it is believed that when these co-crystals come into contact with saliva they instantly dissociate to malate$^{2-}$ or hydrogenmalate$^-$, $Na^+/K^+$ and $H^+$. Thus, the flavour of malic acid is immediately released upon consumption of edible products that have been coated with the malate particles of the present invention.

Another aspect of the invention relates to the use of malate particles containing at least 70 wt. % co-crystal of malic acid and alkali metal hydrogen malate as a food ingredient.

Another aspect of the invention relates to a method of preparing an edible product, said method comprising combining a particulate composition according to the present invention with one or more other food ingredients.

Another aspect of the invention relates to an edible product containing at least 0.05 wt. % of malate particles, said malate particles having a diameter of 50 to 1000 μm and comprising at least 70 wt. % of co-crystal of malic acid and alkali metal hydrogen malate.

Another aspect of the invention relates to a process of preparing malate particles comprising co-crystal of malic acid and alkali metal hydrogen malate, said process comprising:
  providing seed crystal particles containing at least 80 wt. % of crystalline material selected from crystalline organic acid, crystalline salt of organic acid and combinations thereof;
  providing an aqueous malate solution, said solution containing sodium and malate in a molar ratio of 4:10 to 6:10 or containing potassium and malate in a molar ratio of 5.5:10 to 7.5:10;
  spraying the aqueous malate solution onto the seed crystal particles;
  removing water from the coated particles.

Yet another aspect of the invention relates to a process of preparing malate particles comprising co-crystal of malic acid and alkali metal hydrogen malate, said process comprising:
  providing malic acid particles containing at least 80 wt. % of malic acid;
  providing sodium hydrogen malate particles containing at least 80 wt. % of sodium hydrogen malate or potassium hydrogen malate particles containing at least 80 wt. % of potassium hydrogen malate;
  combining 100 parts by weight of the malic acid particles with either 100-138 parts by weight of the sodium hydrogen malate particles or 220-300 parts by weight of potassium hydrogen malate; and 1-10 parts by weight of water;
  subjecting the resulting combination to mechanical shear.

BRIEF DESCRIPTION OF THE DRAWING

FIG. 1 shows the X-ray diffraction pattern of a co-crystal of malic acid and a sodium hydrogen malate (sodium trihydrogen dimalate ($Na^+(C_4H_5O_5)^-\cdot C_4H_6O_5$).

DETAILED DESCRIPTION OF THE INVENTION

In a first aspect, the present invention relates to a particulate composition comprising at least 1 wt. % of malate particles, said malate particles having a diameter of 50 to 1000 μm and comprising at least 70 wt. % of co-crystal of malic acid and alkali metal hydrogen malate.

The term "co-crystal" as used herein refers to a crystalline single phase material composed of two or more different molecular or ionic compounds in a stoichiometric ratio, which are neither solvates nor simple salts.

The X-ray diffraction pattern of a co-crystal of malic acid and sodium hydrogen malate, identified as sodium trihydrogen dimalate ($Na^+(C_4H_5O_5)^-\cdot C_4H_6O_5$), is shown in FIG. 1.

Besides malate particles the particulate composition of the present invention may comprise other particulate components, such as sugar, salt or acid powders.

In one embodiment of the invention, the malate particles represent the bulk of the particulate composition. Accordingly, the particulate composition comprises at least 50 wt. %, preferably at least 75 wt. %, more preferably at least 90 wt. % of the malate particles.

In another embodiment of the invention, the particulate composition comprises a blend of sugar and the malate particles. Such a blend can suitably be used for acid sanding of confectionery. In accordance with this embodiment, the particulate composition comprises 1-95 wt. % of the malate particles and 5-99 wt. % of sugar particles, more preferably 2-50 wt. % of the malate particles and 50-98 wt. % of sugar particles. Even more preferably, the particulate composition comprises 3-30 wt. % of the malate particles and 60-97 wt. % of sugar particles. Preferably, the combination of malate particles and sugar constitutes at least 60 wt. %, more preferably at least 80 wt. % of the particulate composition.

According to a particularly preferred embodiment, the malate particles of the present invention comprise:
  75-100 wt. % of the co-crystal of malic acid and alkali metal hydrogen malate;
  0-25 wt. % of one or more organic acids selected from the group of citric acid, malic acid, lactic acid, tartaric acid and fumaric acid; and
  wherein the combination of the co-crystal and the one or more organic acids constitutes at least 90 wt. % of the malate particles. More preferably, the combination of co-crystal and malic acid constitutes at least 95 wt. % of the malate particles.

The water content of the malate particles typically does not exceed 5 wt. %, more preferably the water content does not exceed 3 wt. %.

For some application it is advantageous to provide malate particles that almost exclusively consist of the co-crystal. In accordance with this embodiment, the malate particles contain at least 90%, preferably at least 95 wt. % of the co-crystal.

It can also be advantageous to tune the flavour profile of the malate particles by including a small amount of the aforementioned one or more organic acids. Accordingly, in a preferred embodiment, the malate particles comprise:

75-95 wt. % of the co-crystal of malic acid and alkali metal hydrogen malate;

5-25 wt. % of the one or more organic acids.

Most preferably, the malate particles of this embodiment comprise 5-25 wt. % of malic acid.

According to a particularly preferred embodiment, the co-crystal of malic acid and alkali metal hydrogen malate is a co-crystal of malic acid and sodium hydrogen malate or a co-crystal of malic acid and potassium hydrogen malate. Even more preferably, the co-crystal is sodium trihydrogen dimalate ($Na^+(C_4H_5O_5)^-\cdot C_4H_6O_5$) or dipotassium tetrahydrogen trimalate ($2[K^+(C_4H_5O_5)^-]\cdot C_4H_6O_5$). Most preferably, the co-crystal employed in accordance with the present invention is sodium trihydrogen dimalate ($Na^+(C_4H_5O_5)^-\cdot C_4H_6O_5$).

The malate particles in the particulate composition of the present invention preferably have a mass weighted average diameter in the range of 50 to 1,000 μm, more preferably of 150 to 750 μm.

The particulate composition typically has a mass weighted average diameter in the range of 50 to 1,000 μm, more preferably of 150 to 750 μm.

The mass weighted average diameter can suitably be determined using a set of sieves of different mesh sizes.

A further embodiment of the invention relates to the use of malate particles containing at least 70 wt. % co-crystal of malic acid and alkali metal hydrogen malate as a food ingredient. Preferably the malate particles employed are malate particles as defined herein before. According to a particularly preferred embodiment, the present use comprises the application of the malate particles as a coating onto the surface of an edible product, such as a confectionery product.

Another aspect of the invention relates to a method of preparing an edible product, said method comprising combining a particulate composition according to the present invention with one or more other food ingredients.

In one embodiment, the present method comprises combining the particulate composition with sugar. In this embodiment, the particulate composition preferably contains at least 20 wt. %, more preferably at least 30 wt. % of malate particles, most preferably at least 50 wt. % of malate particles. By mixing the particulate composition with sugar a coating composition may be prepared that can suitably be used for acid sanding of confectionery products.

In another embodiment, the present method comprises application of the particulate composition onto the surface of an edible product, such as a confectionery product. In this embodiment, the particulate composition preferably comprises 1-95 wt. % of the malate particles and 5-99 wt. % of sugar particles, more preferably 2-50 wt. % of the malate particles and 50-98 wt. % sugar particles.

Another aspect of the invention relates to an edible product containing at least 0.05 wt. %, more preferably 0.15-30 wt. % of malate particles, said malate particles having a diameter of 50 to 1000 μm and comprising at least 70 wt. % of co-crystal of malic acid and alkali metal hydrogen malate.

According to a particularly preferred embodiment, the edible product is coated with the malate particles. More preferably, the edible product is coated with a mixture of malate particles and sugar particles. Even more preferably, the edible product is coated with a particulate composition containing malate particles and sugar particles as described above.

The edible product of the present invention preferably is a confectionery product, more particularly a soft candy.

Yet another aspect of the invention relates to a process of preparing malate particles comprising co-crystal of malic acid and alkali metal hydrogen malate, said process comprising:

providing seed crystal particles containing at least 80 wt. % of crystalline material selected from crystalline organic acid, crystalline salt of organic acid and combinations thereof;

providing an aqueous malate solution, said solution containing sodium and malate in a molar ratio of 4:10 to 6:10 or containing potassium and malate in a molar ratio of 5.5:10 to 7.5:10;

spraying the aqueous malate solution onto the seed crystal particles;

removing water from the coated particles.

The crystalline material in the seed crystal particles preferably is selected from crystalline organic acid, crystalline salt of organic acid and combinations thereof, wherein the organic acid is selected from malic acid, lactic acid, acetic acid, citric acid, fumaric acid, adipic acid, tartaric acid and combinations thereof. More preferably, the crystalline material is selected from crystalline malic acid, crystalline salt of malic acid and combinations thereof. Most preferably, the crystalline material is co-crystal of malic and sodium hydrogen malate ($Na^+(C_4H_5O_5)^-\cdot C_4H_6O_5$) or co-crystal of malic acid and potassium hydrogen malate ($2[K^+(C_4H_5O_5)^-]\cdot C_4H_6O_5$).

The aqueous malate solution that is sprayed onto the particles preferably contains malate in a concentration of at least 1 mol/L, more preferably of at least 1.5 mol/L, most preferably of 2-5 mol/L The aqueous malate solution preferably has a dry matter content of 20-70 wt. %, more preferably of 25-65 wt. % and most preferably of 30-60 wt. %.

The aqueous malate solution is preferably prepared from malic acid by dissolving malic acid in water and adding a neutralizing agent thereto. More preferably, a fully neutralized sodium malate solution is prepared by dissolving malic acid in water and adding a neutralizing agent thereto, and which is mixed with a solution of malic acid in water such that the desired ratio of sodium and malate or potassium and malate is obtained.

The seed crystal particles preferably are employed in the present process in an amount that represents 3-70%, more preferably 5-60%, even more preferably 9-50% by weight of the coated particles obtained after removal of the water.

The aqueous malate solution is preferably sprayed onto a fluidised bed of the seed crystal particles. The bed temperature of this this fluidised bed preferably is in the range of 40-100° C., more preferably in the range of 42-90° C., even more preferably in the range of 44-80° C., most preferably in the range of 45-70° C.

Besides water, malate and sodium or potassium cations, the aqueous malate solution preferably contains no other components in a concentration of more than 0.1 wt. %.

The aqueous malate solution may be prepared by dissolving malic acid and either sodium hydrogen malate or potassium hydrogen malate in water. Alternatively, the aqueous malate solution may be prepared by dissolving malic acid and either sodium hydroxide or potassium hydroxide in water. Another alternative is to prepare the aqueous malate solution by dissolving malic acid and either disodium malate or dipotassium malate.

According to a particularly preferred embodiment of the process, spraying of the aqueous malate solution and removal of water from the coated particles are carried out simultaneously.

In a preferred embodiment of the present process, the spraying and water removal are carried out in a fluidized bed dryer. In another preferred embodiment, the spraying and water removal are carried out in a co-current spray dryer with fines recycle to the spraying nozzle (to act as seed crystals).

A further aspect of the invention relates to a process of preparing malate particles comprising co-crystal of malic acid and alkali metal hydrogen malate, said process comprising:

providing malic acid particles containing at least 80 wt. % of malic acid;
providing sodium hydrogen malate particles containing at least 80 wt. % of sodium hydrogen malate or potassium hydrogen malate particles containing at least 80 wt. % of potassium hydrogen malate;
combining 100 parts by weight of the malic acid particles with either 100-138 parts by weight of the sodium hydrogen malate particles or 200-300 parts by weight of potassium hydrogen malate; and 1-10 parts by weight of water;
subjecting the resulting combination to mechanical shear.

Preferably, the processes described above yield malate particles as defined herein before.

The invention is further illustrated by the following non-limiting examples.

EXAMPLES

Example 1

Powders containing co-crystal of sodium hydrogen malate and malic acid ($Na^+(C_4H_5O_5)^- \cdot C_4H_6O_5$), hereinafter referred to as crystalline MASHM, were produced using a batch fluidized bed granulator on lab scale.

First, seed crystals of MASHM were produced by crystallization from an aqueous solution containing equimolar amounts of sodium hydrogen malate and malic acid, and subsequent milling to a mass weighted average diameter of about 200 μm. Three different seed crystal compositions were prepared. One seed crystal composition consisted of MASHM crystals (Composition 1). Two seed crystal compositions (Compositions 2 and 3) were prepared by mixing the MASHM crystals with malic acid particles in the ratios shown in Table 1.

In addition, an aqueous spraying solution was prepared, containing 1304 mM of $C_4H_5NaO_5$ and 1304 mM of $C_4H_6O_5$

TABLE 1

| Seeding composition | MASHM [wt %] | MA [wt %] |
|---|---|---|
| 1 | 100 | 0 |
| 2 | 70 | 30 |
| 3 | 40 | 60 |

Next, the granulator was charged with the seed crystals to produce a fluidized bed of seed crystals that was heated up to 55° C. When the desired bed temperature had been reached, spraying of the aqueous spraying solution was started. During spraying bed temperature was maintained at 55° C. The total amount of aqueous spraying solution that was sprayed onto the bed of seed crystals was 3.18 mL/g in case of seeding composition 1 and 4.46 mL/g in case of seeding compositions 2 and 3.

After the spraying had ended, the powders were discharged from the granulator. The powders had a mass weighted average diameter of about 300 μm.

Another powder was produced by dry blending the MASHM powder and malic acid powder in a weight ratio of 85:15 (Powder 4).

The compositions of the 4 powders so prepared and of a reference consisting of a commercially available malic acid powder (Purac® Powder MA—malic acid particles coated with sodium hydrogen malate) are shown in Table 2.

TABLE 2

| | In wt. % | | | |
|---|---|---|---|---|
| | MASHM | $C_4H_6O_5$ | $C_4H_5NaO_5$ | Moisture |
| Powder 1 | 99.7 | | | 0.3 |
| Powder 2 | 89.5 | 10 | | 0.5 |
| Powder 3 | 79.5 | 20 | | 0.5 |
| Powder 4 | 84.7 | 15 | | 0.3 |
| Reference | | 50-58 | 42-50 | ≤2 |

MASHM content of the samples was checked by means of DSC analyses. DSC analyses show endothermic and exothermic phase transitions in sample while it is being heated. The melting peaks of MASHM and malic acid are known. The area under the peak is correlated to the amount of the material and is compared with area under the melting peak of pure MASHM sample (confirmed with X-ray analyzes). The composition is then confirmed through mass balance or Na, K content analyses. This way it was confirmed that the powders 1, 2, 3 and 4 were fully crystallized into MASHM.

The hygroscopicity of these five powders was determined at 30° C. and a relative humidity of 75%. The results are shown in Table 3.

TABLE 3

| | Water uptake after 14 days (wt. %) |
|---|---|
| Powder 1 | 0.0 |
| Powder 2 | 6.8 |
| Powder 3 | 11.5 |
| Powder 4 | 10.6 |
| Reference | 14.1 |

The result for Powder 1 is in line with the result of dynamic vapor sorption tests of this material which showed hardly any change in mass of the product after an adsorption run from 0-90% humidity, indicating that the material is non-hygroscopic.

Example 2

The acid powders described in Example 1 were used to prepare acid sanded gummi bears as described below.

Gummi bears (Haribo, NL) were steam treated in order to make the surface sticky and were then acid sanded with a mixture of 12 wt. % acid powder and 88 wt. % fine sugar. Two acid sanded candies were introduced into a vacuum bag together with 1 gram of extra acid sanding composition, and the package was sealed. The bags were stored for four weeks in a climate cabinet at 30° C. and 75% RH. After the storage period the powder was visually assessed by an expert panel.

The results are summarized in Table 4.

TABLE 4

| Acid sanding powder | Appearance after 4 weeks |
|---|---|
| 1 | Stable |
| 2 | Stable |
| 3 | Starting to attract moisture |
| 4 | Starting to attract moisture |
| Reference | Wet, particles partially dissolved |

Acid sanding powders 1-4 all had a better appearance than the reference. The moisture uptake was least for the powders with no or little free malic acid.

Four weeks after preparation, the acid taste profiles of the gummi bears were evaluated by an expert panel. The panel determined the speed with which sourness was released, perceived sourness intensity and lasting of sourness. The results are summarized in Table 5.

TABLE 5

| Acid sanding powder | Sourness release (Fast to slow 1-9) | Sourness intensity (low to high 1-9) | Lasting of sourncess (short to long 1-9) |
|---|---|---|---|
| 1 | 3.5 | 4.6 | 4.9 |
| 2 | 3.1 | 5.0 | 5.2 |
| 3 | 3.8 | 3.9 | 3.8 |
| 4 | 4.5 | 4.0 | 4.5 |
| Reference | 3.2 | 4.8 | 4.3 |

The results of the sensory evaluation show that the sourness profile of acid sanding powders 1-4 is equivalent or close to that of the Reference. The best results were obtained with acid sanding powder 2, comprising 90% MASHM and 10% malic acid.

Example 3

A jacketed, glass vessel of 100 ml was charged with 51.36 g (0.383 mol) of DL-malic acid and 30.17 g of demineralised water. The vessel was connected to a circulating thermostatic bath and heated to 55° C. while being stirred by a magnetic stirrer until the malic acid crystals had fully dissolved. Next, potassium hydroxide 50% (9.37 g, 0.083 mol) was added. The temperature rose to 67° C. and a clear, yellow solution was obtained. The solution was allowed to cool to room temperature, while stirring.

In order to obtain seed crystals, a small amount of the liquid was transferred to an open aluminium cup and allowed to concentrate at ambient temperature by slow evaporation of water. After two weeks all of the water present had evaporated and a crystalline product had formed.

A small piece of this crystalline material was used a seed in the rest of the liquid (now in a glass bottle). After one weekend a slightly turbid solution was formed, containing small crystals.

Analysis of the crystals showed that these crystals consisted of bis(potassium hydrogen DL-malate)•malic acid.

Example 4

A jacketed, glass vessel of 100 ml was charged with 51.26 g (0.382 mol) of DL-malic acid, 15.50 g of demineralised water and 9.39 g potassium hydroxide 50% (0.084 mol). The vessel was connected to a circulating thermostatic bath and heated to 40° C. while being stirred by a magnetic stirrer until the malic acid was fully dissolved. Next, the solution was slowly cooled. At 30° C. some crystal slurry obtained from Example 1 was added as seed crystals. Further cooling to 21.5° C. did not result in much crystal formation. After one night a viscous slurry was formed containing needle/rod-like crystals.

After another 3 days of slow stirring, the slurry was filtered (200 mbar) on a 55 mm paper filter. Filtration time was about 5 minutes. No washing was applied.

The crystal cake (8.38 g) was dried for 2.5 hours at room temperature and a pressure of less than 10 mbar. The dried product (7.49 g) was grinded in a mortar and pestle.

Analysis of the crystals showed that they consisted of bis(potassium hydrogen DL-malate)•malic acid.

Dynamic vapor sorption tests of this crystalline material revealed that the material was stable at humidities up to 70% but started to pick up moisture at higher levels of humidity.

The invention claimed is:

1. A particulate composition, comprising at least 1 wt. % of malate particles having a diameter of 50 to 1000 μm and comprising at least 70 wt. % of co-crystal of malic acid and alkali metal hydrogen malate.

2. The particulate composition according to claim 1, wherein the malate particles comprise:
   (a) 75-100 wt. % of the co-crystal;
   (b) 0-25 wt. % of one or more organic acids selected from the group of citric acid, malic acid, lactic acid, tartaric acid and fumaric acid,
   wherein the combination of the co-crystal and the one or more organic acids constitutes at least 90 wt. % of the malate particles.

3. The particulate composition according to claim 2, wherein the malate particles comprise at least 90% of the co-crystal.

4. The particulate composition according to claim 3, wherein the malate particles comprise at least 95 wt. % of the co-crystal.

5. The particle composition according to claim 2, wherein the malate particles comprise:
   (a) 75-95 wt. % of the co-crystal; and
   (b) 5-25 wt. % of the one or more organic acids.

6. The particulate composition according to claim 5, wherein the malate particles comprise 5-25 wt. % of malic acid.

7. The particulate composition according to claim 1, wherein the particulate composition comprises at least 50 wt. % of the malate particles.

8. The particulate composition according to claim 1, wherein the particulate composition comprises 1-95 wt. % of the malate particles and 5-99 wt. % of sugar particles.

9. The particulate composition according to claim 1, wherein the co-crystal is a co-crystal of malic acid and sodium hydrogen malate or a co-crystal of malic acid and potassium hydrogen malate.

10. The particulate composition according to claim 9, wherein the co-crystal is sodium trihydrogen dimalate represented by formula $Na^+(C_4H_5O_5)^-\cdot C_4H_6O_5$.

11. A process of preparing malate particles comprising co-crystal of malic acid and alkali metal hydrogen malate, the process comprising:
   (a) providing seed crystal particles containing at least 80 wt. % of crystalline material selected from crystalline organic acid, crystalline salt of organic acid and combinations thereof;
   (b) providing an aqueous malate solution, comprising sodium and malate in a molar ratio of 4:10 to 6:10 or comprising potassium and malate in a molar ratio of 5.5:10 to 7.5:10;

(c) spraying the aqueous malate solution onto the seed crystal particles to produce coated particles;
(d) removing water from the coated particles.

12. A process of preparing malate particles comprising co-crystal of malic acid and alkali metal hydrogen malate, the process comprising:
   (a) providing malic acid particles comprising at least 80 wt. % of malic acid;
   (b) providing sodium hydrogen malate particles comprising at least 80 wt. % of sodium hydrogen malate or potassium hydrogen malate particles comprising at least 80 wt. % of potassium hydrogen malate;
   (c) combining 100 parts by weight of the malic acid particles with either 100-138 parts by weight of the sodium hydrogen malate particles or 200-300 parts by weight of potassium hydrogen malate; and 1-10 parts by weight of water;
   (d) subjecting the resulting combination to mechanical shear.

13. A method of preparing an edible product, the method comprising combining a particulate composition according to claim 1 with one or more other food ingredients.

14. A particulate coating for an edible product wherein the coating comprises a particulate composition comprising at least 1 wt. % of malate particles having a diameter of 50 to 1000 μm and comprising at least 70 wt. % of co-crystal of malic acid and alkali metal hydrogen malate.

15. The particulate coating according to claim 14, wherein the edible product is a confectionery product.

16. The particulate coating according to claim 14, further comprising sugar particles.

\* \* \* \* \*